United States Patent [19]

Selle

[11] Patent Number: 5,599,623
[45] Date of Patent: Feb. 4, 1997

[54] ARAMID COMPOSITION

[75] Inventor: Beverly J. Selle, Wilmington, Del.

[73] Assignee: E. I. Du Pont de Nemours and Company, Wilmington, Del.

[21] Appl. No.: 585,602

[22] Filed: Jan. 16, 1996

Related U.S. Application Data

[63] Continuation of Ser. No. 336,035, Nov. 8, 1994, abandoned.

[51] Int. Cl.$^6$ ............................. D02G 3/00; C08G 69/26
[52] U.S. Cl. ........................ 428/364; 528/335; 528/339; 528/344; 528/347
[58] Field of Search ............................. 528/335, 339, 528/344, 347; 428/364

[56] References Cited

U.S. PATENT DOCUMENTS

| | | | |
|---|---|---|---|
| 3,671,542 | 6/1972 | Kwolek | 524/606 |
| 4,172,938 | 10/1979 | Mera et al. | 528/336 |
| 5,310,861 | 5/1994 | Irwin | 528/339 |

*Primary Examiner*—Samuel A. Acquah

[57] ABSTRACT

An aramid composition consisting essentially of repeat units derived from p-phenylenediamine, terephthalic acid, 3,3'-bibenzoic acid, and optionally chloroterephthalic acid, is disclosed. The aramids are especially useful for fibers, which after drawing usually have enhanced tensile moduli and strengths, which makes them especially useful in ropes and cables, and in composites.

5 Claims, No Drawings

ARAMID COMPOSITION

This is a continuation of application Ser. No. 08/336,035 filed Nov. 8, 1994, now abandoned.

FIELD OF THE INVENTION

This invention concerns an aramid polymer whose repeat units are derived from p-phenylenediamine, terephthalic acid, 3,3'-bibenzoic acid, and optionally chloroterephthalic acid.

TECHNICAL BACKGROUND

Aromatic polyamides, or aramids, are useful for a variety of applications particularly as fibers. Some of these polymers have high strength, modulus, thermal resistance, etc. Thus, aramids with combinations of good physical properties are constantly sought. This usually means making aramids with new combinations of repeat units.

U.S. Pat. No. 4,172,938 is such a typical patent and describes various repeat units which are useful as aramids. The specific aramids disclosed herein are not described.

SUMMARY OF THE INVENTION

This invention concerns an aramid, consisting essentially of about 5 to about 50 mole percent of the repeat unit

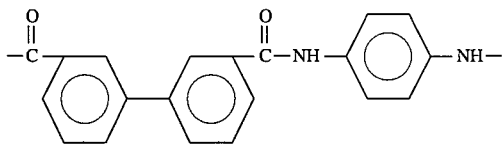

0 to about 25 mole percent of the repeat unit

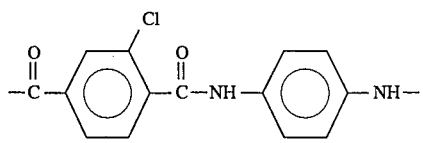

and

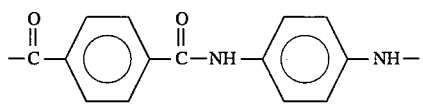

is the remainder of the units.

DETAILS OF THE INVENTION

Disclosed herein is an aramid which contains two mandatory repeat units and an optional repeat unit. Unit (I) is derived from 3,3'-bibenzoic acid and p-phenylenediamine (PPD), optional unit (II) is derived from chloroterephthalic acid and PPD, and unit (III) is derived from terephthalic acid and PPD. In preferred aramids, unit (I) is about 10 to about 25 mole percent, and/or unit (II) is 0 to about 15 mole percent of the repeat units present, more preferably 0 mole percent. Repeat unit (III) makes up the remainder of the aramid.

Although the repeat units are formally derived from various aromatic dicarboxylic acids and PPD, the aramid itself is usually made from reactive equivalents of the dicarboxylic acids, most typically the acyl chlorides. The polymers can be made by methods well known to the artisan for production of aramids, see for instance U.S. Pat. No. 3,673,143 and the Examples herein.

It is preferred if the aramids herein have an inherent viscosity of at least 2.5 or more (in sulfuric acid at 0.5% concentration), more preferably 3.0 or more, and especially preferably 3.5 or more. As understood by the artisan, the end groups in the polymer may be carboxyl or amino if either was present in excess during the polymerization, or may be derived from a deliberately added chain stopper, or may be derived from adventitious impurities in the polymerization process.

These aramids have excellent physical properties, particularly in the form of fibers. Surprisingly, as made fibers of these aramids may be drawn and the drawn fibers often have a higher tensile modulus and tensile strength than the undrawn fiber, an excellent combination of properties. Such drawing and aramid properties are described in the Examples. This makes the instant aramids particularly useful in ropes and cables, and as the reinforcement in composites with thermoplastics or thermosetting resins.

In Differential Scanning Calorimetry (DSC) analyses, in the first heating cycle the polymer was heated from ambient temperature to 410° C. at 10° C./min, and then cooled to ambient temperature. On the second heat the aramid was heated at 10° C./min to 650° C. In ThermoGravimetric Analysis (TGA) a heating rate of 20° C./min was used.

Terephthaloyl chloride (TCl) was distilled (90° C., 0.1 mm Hg) or used as received. Dimethyl 3,3'-biphenyldicarboxylate was prepared via the general coupling of aryl chlorides by nickel and reducing metals described by I. Colon and D. R. Kelsey, *J. Org. Chem.*, 51, 2627–2637 (1986), or by the general procedure for palladium-catalyzed aryl halide coupling in the presence of an alkaline earth metal carbonate in dry methanol described in Japanese Patent Application 03-2279. The 3,3'-biphenyldicarboxylic acid was prepared via the hydrolysis of dimethyl 3,3'-biphenyldicarboxylate with LiOH in a methanol/$H_2O$ mixture according to the general procedure described by Corey et al., *Tetrahedron Lett.*, 3529 (1977). Conversion to the acid chloride was accomplished in refluxing thionyl chloride with catalytic DMF. All polymerization reactions were conducted under an atmosphere of dry nitrogen or argon. Anhydrous 1-methyl-2-pyrrolidinone (NMP) was stored over activated sieves. Infrared spectroscopy was performed on a Nicolet 60SX FTIR spectrophotometer. Major infrared peaks are reported in wavenumbers ($cm^{-1}$). Thermogravimetric analysis was performed on a 2950 TGA TA instrument. Differential scanning calorimetry was performed on a 2910 DSC TA instrument. Multifilament fibers were spun on a Rheometer Spinning Unit or on a Microspinning Unit.

General Procedure for Making the Spin Dope and Spinning

The polymer was dried overnight (100° C., vacuum oven) prior to preparing the dope. A double helix Atlantic mixer was assembled, heated to 80° C. and purged with $N_2$ for 2 hours, and cooled to room temperature. To the room temperature mixer was added 100% $H_2SO_4$, which was cooled to result in a sulfuric acid "snow" (−63° C.) with a dry ice/acetone bath. The dry polymer was added to the acid snow, and stirred while slowly allowing to come to room temperature. The mixture was heated (−60°–80° C.) until a viscous, single phase dope resulted. The dope was de-aerated under vacuum, transferred into the spin cell using a $N_2$ stream, and then air-gap spun. The collected fiber samples were soaked in water until neutral. Tensile measurements were made on 1" filament samples, unless otherwise stated. Fiber samples were heat-treated by drawing over a hot pin (0.75" diameter) by hand. Draw was calculated as a percentage.

EXAMPLE 1

Into an oven dried resin kettle was added 7.78 g (70.1 mmol) of calcium chloride (dried at 400° C. under $N_2$) and 95.1 g of anhydrous NMP. The resin kettle was equipped with an air-driven cage-type stirrer and a nitrogen purge. The suspension was heated to 75° C. for 1 hr to aid in salt dissolution. The mixture was cooled to room temperature, charged with 5.347 g (49.45 mmol) of PPD, and stirred until PPD dissolution was complete. The amine solution was cooled to 0° C., then a mixture of 1.384 g (4.958 mmol) of 3,3'-biphenyldicarbonylchloride and 1.844 g (9.083 mmol) of TCl was added and stirred for 4.75 min at 0° C. The ice bath was removed, and stirring was continued for 10.75 min. To the suspension was added 7.217 g (35.55 mmol) of TCl. The stirring speed was changed from moderate to high. The mixture gelled 1.5 min later, thickening continued until a crumb resulted after 6 min. The polymer was washed with 3×200 mL of $H_2O$, 100 mL of 1.4% NaOH, 2×200 mL of $H_2O$, 100 mL of acetone, and 3×200 mL of $H_2O$. The solid was dried (100° C., 20 in. Hg) to afford 12.03 g of polymer. $\eta_{inh}$=2.79 dL/g (0.5%, $H_2SO_4$). The polymer is soluble (0.5% solids) in NMP/$CaCl_2$, and sparingly soluble in 4% LiCl/DMAc. No apparent polymer solubility in ethyl acetate, acetone, ethanol, or dichloromethane was observed. Thermogravimetric analysis (TGA) indicates incipient weight loss at 487° C. in $N_2$, and at 477° C. in air. Differential scanning calorimetry (DSC) indicates no thermal event prior to decomposition.

EXAMPLE 2

Into an oven dried resin kettle was added 15.45 g (0.139 mol) of calcium chloride and 188.12 g of anhydrous NMP. The resin kettle was equipped with an air-driven cage-type stirrer and a nitrogen purge. The suspension was heated to 75° C. for 3.25 hrs to aid in salt dissolution. The mixture was cooled to room temperature, charged with 10.601 g (98.03 mmol) of PPD, and stirred until PPD dissolution was complete. At room temperature, 2.745 g (9.83 mmol) of 3,3'-biphenyldicarbonylchloride was added, stirred 20 sec, and 5.000 g (24.63 mmol) of TCl was added. Stirring was continued for 17.5 min. To the mixture was added 12.962 g (63.85 mmol) of TCl. The stirring speed was changed from moderate to high 1 min later, at which time a gel resulted. A crumb resulted 160 sec following completed acid chloride addition. Stirring was continued 10 min after crumb formation. The polymer was washed with 3×500 mL of $H_2O$, 300 mL of 4% NaOH, 2×500 mL of $H_2O$, 300 mL of acetone, and 2×400 mL of $H_2O$. The solid was dried (100° C., 20 in. Hg) to afford 24.05 g of polymer $\eta_{inh}$=4.18 dL/g (0.5%, $H_2SO_4$). IR (KBr) 3288, 3035, 1653, 1648, 1608, 1545, 1512, 1491, 1406, 1316.

EXAMPLE 3

The Atlantic mixer was assembled, heated to 80° C., purged for 2 hr with $N_2$, cooled to room temperature, and stored under $N_2$. To the mixer was added 93.5 g of sulfuric acid (100%). The acid was cooled in a dry ice/acetone bath (−61° C.) to afford an acid "snow"; to the snow was added 22.5 g of PPD-T/3,3'-BB (90/10) polymer crumb, ($\eta_{inh}$=4.11 dL/g). The solids were stirred for 1 hr while slowly allowing to warm to room temperature. The mixer was heated to 73° C. and stirred for 0.75 hr, then heated to 80° C. and stirred for 1.25 hr under vacuum. The viscous yellow spin dope was transferred to the spin cell, and spun into fibers at 75°–80° C. The collected fiber samples were soaked in $H_2O$ until neutral. Fiber specimens were prepared under a variety of conditions as shown in Table 1. As-spun filament properties (average of 5 breaks) with highest single break values given in parenthesis are given in Table 2. Fiber $\eta_{inh}$=3.31 dL/g. Properties of drawn filaments are shown in Table 3.

TABLE 1

| Fiber | Jet (mpm) | SSF | Spinneret Temp (°C.) | $H_2O$ Quench Bath (°C.) |
|---|---|---|---|---|
| 1 | 10.5 | 9.7 | 75 | 2.9 |
| 2 | 10.5 | 13.0 | 80 | 3.2 |

TABLE 2

| PPD-T/3,3'-BB (90/10) Sample No. | Tgpd | E % | $M_i$ gpd |
|---|---|---|---|
| 1 | 11.7 (13.5) | 4.2 (4.5) | 364 (392) |
| 2 (four filament breaks) | 4.9 (5.7) | 4.6 (4.7) | 195 (234) |

TABLE 3

| PPD-T/3,3'-BB (90/10) | T gpd/E %/$M_i$ gpd |
|---|---|
| as-spun | 11.8/4.0/414 |
| 400° C./0.8% draw | 14.0/2.9/519 |
| 425° C./0.8% draw | 14.1/3.4/453 |
| 465° C./0.8% draw | 14.4/2.8/546 |

EXAMPLE 4

Into an oven dried resin kettle was added 7.79 g (70.2 mmol) of calcium chloride and 95.1 g of anhydrous NMP. The resin kettle was equipped with an air-driven cage-type stirrer and a nitrogen purge. The suspension was heated to 75° C. to aid in salt dissolution. The mixture was cooled to room temperature, charged with 5.347 g (49.45 mmol) of PPD, and stirred until PPD dissolution was complete. The amine solution was cooled to 0° C., then 1.384 g (4.958 mmol) of 3,3'-BBCl was added. After stirring 9.3 min, 1.117 g (4.704 mmol) of ClTCl was added, then an additional 0.095 g (0.400 mmol) of ClTCl was added in 3 min. The mixture was stirred an additional 13 min at 0° C., 2.005 g (9.88 mmol) of TCl was added, stirred 3 min, and 6.048 g (29.79 mmol) of TCl was added. The reaction gelled after 2 min, and a dry crumb resulted after an additional 10 min. The polymer was stirred 10 min after crumbing, sat 10 min without stirring, then was washed with 3×200 mL of $H_2O$, sat in 200 mL of $H_2O$ overnight, washed with 3×200 mL of $H_2O$, 100 mL of 1.4% NaOH, 2×200 mL of $H_2O$, 100 mL of acetone, and 3×200 mL of $H_2O$. The solid was dried (100° C., 20 in. Hg) to afford 11.73 g of polymer. $\eta_{inh}$=3.40 (0.5%, $H_2SO_4$). The polymer is soluble (0.5% solids) in NMP/$CaCl_2$, and sparingly soluble in 4% LiCl/DMAc. No apparent polymer solubility in ethyl acetate, acetone, ethanol, or dichloromethane was observed. Thermogravimetric analysis (TGA) indicates incipient weight loss at 474° C. in $N_2$, and at 465° C. in air. Differential scanning calorimetry (DSC) indicates no thermal event prior to decomposition.

EXAMPLE 5

Into an oven dried resin kettle was added 7.79 g (70.2 mmol) of calcium chloride and 95.0 g of anhydrous NMP. The resin kettle was equipped with an air-driven cage-type stirrer and a nitrogen purge. The suspension was heated to 75° C. to aid in salt dissolution. The mixture was cooled to room temperature, charged with 5.342 g (49.40 mmol) of PPD, and stirred until PPD dissolution was complete. The amine solution was cooled to 0° C., then 1.383 g (4.95 mmol) of 3,3'-BBCl was added. The ice bath was removed 1 min later, returned to cool the resin kettle after 5 min, then 1.179 g (4.97 mmol) of ClTCl was added 16 min following the 3,3'-BBCl addition. The mixture was stirred an additional 9 min at 0° C., 2.00 g (9.88 mmol) of TCl was added, stirred 5.5 min, and 6.047 g (29.79 mmol) of TCl was added. The reaction gelled after 3 min, and a dry crumb resulted after an additional 4.5 min. The polymer was stirred 12 min after crumbing, sat 17 min without stirring, then was washed with 3×250 mL of $H_2O$, 250 mL of 1.4% NaOH, 2×250 mL of $H_2O$, 200 mL of acetone, and 2×250 mL of $H_2O$. The solid was dried (100° C., 20 in. Hg) to afford 12.01 g of polymer. $\eta_{inh}$=3.88 dL/g (0.5%, $H_2SO_4$). IR (KBr) 3286, 3030, 1653, 1648, 1608, 1545, 1513, 1405, 1314.

EXAMPLE 6

The Atlantic mixer was assembled, heated to 80° C., purged for 2 hr with $N_2$, and cooled to room temperature. To the mixer was added 87.4 g of sulfuric acid (100%). The acid was cooled in a dry ice/acetone bath (−63° C.) to afford an acid "snow"; to the snow was added 21.0 g of PPD-T/3,3'-BB/ClT (80/10/10) polymer crumb, ($\eta_{inh}$=3.79). The solids were stirred for 30 min while slowly allowing to warm to room temperature. The mixer was heated to 65° C. and stirred for 30 min, heated to 70° C. and stirred for 30 min, heated to 75° C. and stirred for 30 min, and heated to 80° C. and stirred for 0.8 hr under vacuum. The mixer was filled with $N_2$, then the spin dope was transferred to the spin cell with $N_2$ pressure. The collected fiber samples were soaked in $H_2O$ until neutral. Fiber specimens were prepared under a variety of conditions as shown in Table 4. As-spun filament properties (average of 5 breaks) with highest tenacity levels given in parenthesis are given in Table 5. Fiber $\eta_{inh}$=2.69 dL/g. Properties of drawn filaments are shown in Table 6.

TABLE 4

| Fiber | Jet (mpm) | SSF | Spinneret Temp (°C.) | $H_2O$ Quench Bath (°C.) |
|---|---|---|---|---|
| 1 | 11.5 | 4.46 | 76 | 17 |
| 2 | 12.1 | 6.08 | 76 | 17 |
| 3 | 24.5 | 3.15 | 76 | 11 |
| 4 | 27.1 | 6.67 | 75 | 15 |
| 5 | 26.6 | 8.73 | 75 | 7 |
| 6 | 39.3 | 6.82 | 74 | 6 |
| 7 | 45.0 | 3.88 | 74 | 11 |
| 8 | 42.3 | 3.53 | 74 | 13 |

TABLE 5

| PPD-T/3,3'-BB (90/10) (80/10/10) Sample No. | Tgpd | E % | $M_i$ gpd |
|---|---|---|---|
| 1 (six filament breaks) | 9.2 (11.3) | 4.0 (5.2) | 404 (408) |
| 2 | 10.7 (12.1) | 4.5 (5.5) | 419 (433) |
| 3 | 9.2 (10.0) | 4.4 (4.8) | 364 (394) |
| 4 | 9.2 (9.7) | 3.7 (4.0) | 414 (457) |
| 5 | 9.8 (13.2) | 3.9 (5.6) | 417 (427) |
| 6 | 10.2 (11.8) | 4.5 (5.2) | 399 (419) |
| 7 | 9.4 (9.9) | 4.4 (4.7) | 390 (414) |
| 8 | 8.7 (9.2) | 4.2 (4.5) | 366 (379) |

TABLE 6

| PPD-T/3,3'-BB/ClT (80/10/10) | T gpd/E %/$M_i$ gpd |
|---|---|
| as-spun | 9.6/3.8/406 |
| 375° C./1.5% draw | 11.8/2.5/562 |
| 400° C./1.5% draw | 10.1/2.4/561 |
| 420° C./1.5% draw | 10.8/2.4/526 |

EXAMPLE 7

Into an oven dried resin kettle was added 15.44 g (0.1391 mol) of calcium chloride and 188 g of anhydrous NMP. The resin kettle was equipped with an air-driven cage-type stirrer and a nitrogen purge. The suspension was heated to 75° C. to aid in salt dissolution. The mixture was cooled to room temperature, charged with 10.600 g (98.02 mmol) of PPD, and stirred until PPD dissolution was complete. The amine solution was cooled to 0° C., then 1.371 g (4.91 mmol) of 3,3'-BBCl was added. The mixture was stirred for 9 min, then 1.168 g (4.92 mmol) of ClTCl was added via syringe. The ice bath was removed 9 min later, and 6.000 g (29.55 mmol) of TCl was added. Five min later, 11.955 g (58.89 mmol) of TCl was added. Three minutes after reagent addition was complete, a gel had formed; the gel thickened and crumbed within the next 3 min. The crumb was stirred 10 min, washed with 5×500 mL and 400 mL of $H_2O$. A sample was removed and dried (100° C., 20 in. Hg) to afford 1.18 g of polymer, $\eta_{inh}$=3.54 (0.5%, $H_2SO_4$). The remaining polymer was washed with 500 mL of $H_2O$, 500 mL of acetone, and 3×500 mL of $H_2O$ to afford an additional 20.55 g of polymer, $\eta_{inh}$=3.56 (0.5%, $H_2SO_4$).

EXAMPLE 8

The Atlantic mixer was assembled, heated to 80° C., purged for 2 hr with $N_2$, and cooled to room temperature. To the mixer was added 85.0 g of sulfuric acid (100%). The acid was cooled in a dry ice/acetone bath (−60° C.) to afford an acid "snow"; to the snow was added 20.46 g of PPD-T/3, 3'-BB/ClT (90/5/5) polymer crumb, ($\eta_{inh}$=3.56). The solids were stirred for 30 min while slowly allowing to warm to room temperature. The mixer was heated to 71° C. and stirred for 1 hr, under $N_2$. A vacuum was pulled on the mixture while stirring continued for 0.8 hr at 71° C. The temperature was increased to 75° C., and stirred under vacuum for 0.3 hr. The mixture was charged with $N_2$ and transferred to the spin cell with $N_2$ pressure. Fiber specimens were prepared under a variety of conditions as shown in Table 7. As-spun filament properties (average of 5 breaks) with highest tenacity levels given in parenthesis are given in Table 8. Fiber $\eta_{inh}$=2.89. Properties of drawn filaments are shown in Table 9.

TABLE 7

| Fiber | Jet (mpm) | SSF | Spinneret Temp (°C.) | H₂O Quench Bath (°C.) |
|---|---|---|---|---|
| 1 | 20.5 | 6.19 | 70 | 6.4 |
| 2 | 20.5 | 8.29 | 69 | 6.4 |
| 3 | 20.5 | 9.76 | 66 | 6.4 |

TABLE 8

| PPD-T/3,3'-BB/ClT (90/5/5) Sample No. | Tgpd | E % | $M_i$ gpd |
|---|---|---|---|
| 1 | 12.6 (13.5) | 4.6 (4.8) | 287 (296) |
| 2 | 14.1 (15.3) | 4.9 (5.2) | 320 (342) |
| 3 | 13.6 (15.2) | 4.5 (4.9) | 343 (364) |

TABLE 9

| PPD-T/3,3'-BB/ClT (90/5/5) | T gpd/E %/$M_i$ gpd |
|---|---|
| as-spun | 13.5/4.3/409 |
| 400°C./negligible draw | 14.7/2.6/632 |
| 425° C./0.8% draw | 13.9/2.1/717 |
| 450° C./1.5% draw | 13.5/2.4/586 |
| 465° C./1.5% draw | 15.0/2.3/680 |

EXAMPLE 9

Into an oven dried resin kettle was added 14.58 g (0.131 mol) of calcium chloride and 177.47 g of anhydrous NMP. The resin kettle was equipped with an air-driven cage-type stirrer and a nitrogen purge. The suspension was heated to 75° C. to aid in salt dissolution. The mixture was cooled to room temperature, charged with 10.000 g (92.47 mmol) of PPD, stirred until PPD dissolution was complete, then 3.881 g (4.91 mmol) of 3,3'-BBCl was added. To the reaction mixture was added 1.100 g (4.63 mmol) of ClTCl, ~⅓ of 15.057 g (74.17 mmol) of TCl, then the remaining TCl was added. Opalescence resulted 30 sec after terephthaloyl chloride addition was complete, followed by gel formation (90 sec), and by a dry crumb (505 sec). The crumb was washed with 3×300 mL of H₂O, 300 mL of 1.4% NaOH, 2×300 mL of H₂O, 300 mL of acetone, and 300 mL of H₂O. The solid was dried (100° C., 20 in. Hg) to afford 23.08 g of polymer, $\eta_{inh}$=3.30 dL/g (0.5%, H₂SO₄).

What is claimed is:

1. An aramid fiber consisting essentially of about 5 to about 50 mole percent of the repeat unit

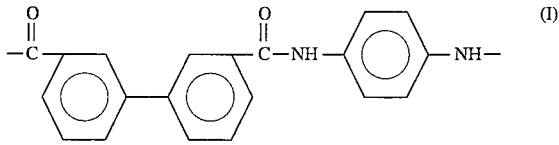

0 to about 25 mole percent of the repeat unit

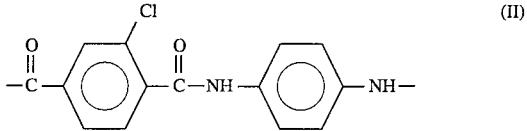

and

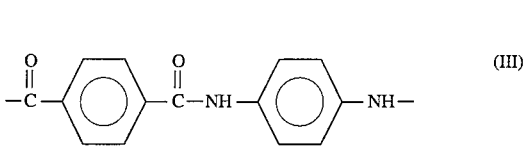

is the remainder of the units.

2. The aramid as recited in claim 1 wherein (I) is about 10 to about 25 mole percent of said repeat units.

3. The aramid as recited in claim 1 wherein (II) is between 0 and about 15 mole percent of said repeat units.

4. The aramid as recited in claim 2 wherein (II) is between 0 and about 15 mole percent of said repeat units.

5. The aramid as recited in claim 1 in the form of a drawn fiber.

* * * * *

UNITED STATES PATENT AND TRADEMARK OFFICE
CERTIFICATE OF CORRECTION

PATENT NO. : 5,599,623
DATED : February 4, 1997
INVENTOR(S) : Beverly J. Selle

It is certified that error appears in the above-identified patent and that said Letters Patent is hereby corrected as shown below:

In column 2, line 64, please delete "temperature. The mixture was heated (-60°-80° C.) until a" and replace with:

--temperature. The mixture was heated (-60°-80° C.) until a--.

In column 5, line 60, Table 5, replace the first line of the first column heading "PPD-T/3,3'-BB (90/10)" and replace with:

--PPD-T/3,3'-BB/ClT--.

In column 6, line 1, Table 5 cont'd, replace the first line of the first column heading "PPD-T/3,3'-BB (90/10)" and replace with:

--PPD-T/3,3'-BB/ClT--.

Signed and Sealed this

Twenty-first Day of October 1997

Attest:

BRUCE LEHMAN

Attesting Officer

Commissioner of Patents and Trademarks